United States Patent [19]

Harvison

[11] Patent Number: 5,380,549

[45] Date of Patent: Jan. 10, 1995

[54] METHOD FOR FORMING TRAFFIC SURFACES HAVING DOUBLE-COATED BONDING OF ANTI-SLIP PARTICLES AND CONTAINING RETRO-REFLECTIVE BEADS

[76] Inventor: Eric J. Harvison, Hillside Close, off Henley Road, Marlow, Buckinghamshire SL7 2DF, Great Britain

[21] Appl. No.: 920,305

[22] PCT Filed: Feb. 14, 1991

[86] PCT No.: PCT/GB91/00226

§ 371 Date: Aug. 12, 1992

§ 102(e) Date: Aug. 12, 1992

[87] PCT Pub. No.: WO91/12090

PCT Pub. Date: Aug. 22, 1991

[30] Foreign Application Priority Data

Feb. 14, 1990 [GB] United Kingdom ............... 9003336
Aug. 23, 1990 [GB] United Kingdom ............... 9018524

[51] Int. Cl.⁶ .................. B05D 5/02; E01C 11/24
[52] U.S. Cl. .................. 427/137; 427/199; 427/203; 427/204; 404/14; 404/20; 428/143; 428/149; 428/206
[58] Field of Search ........... 427/136, 137, 197, 199, 427/203, 204, 205; 404/12, 14, 18, 19, 20, 21, 31, 32; 428/142, 143, 147, 148, 149, 150, 204, 206

[56] References Cited

U.S. PATENT DOCUMENTS

| | | | |
|---|---|---|---|
| 2,298,664 | 10/1942 | Van Patter | 428/143 |
| 2,330,843 | 10/1943 | Rodli et al. | 404/14 |
| 3,787,273 | 1/1974 | Okrepkie et al. | 428/147 |
| 3,914,468 | 10/1975 | Condon et al. | |
| 4,020,211 | 4/1977 | Eigenmann | 428/328 |
| 4,069,281 | 1/1978 | Eigenmann | 264/35 |
| 4,117,192 | 9/1978 | Jorgensen | 427/137 |
| 4,243,696 | 1/1981 | Toth | |
| 4,248,932 | 2/1981 | Tung et al. | 404/20 |
| 4,282,281 | 8/1981 | Ethen | 427/137 |
| 4,328,274 | 5/1982 | Tarbutton et al. | 428/149 |
| 4,363,145 | 12/1982 | Kawesch | |
| 4,371,663 | 2/1983 | Soltysyk | 523/172 |
| 4,405,657 | 9/1983 | Miller, Jr. et al. | 427/204 |
| 4,418,109 | 11/1983 | Miller, Jr. et al. | 428/143 |
| 4,555,292 | 11/1985 | Thompson | 428/143 |
| 4,606,154 | 8/1986 | Herrmann et al. | |
| 4,622,257 | 11/1986 | Thompson | 428/143 |
| 4,662,972 | 5/1987 | Thompson | 427/203 |
| 4,929,294 | 5/1990 | Blome | 156/187 |

FOREIGN PATENT DOCUMENTS

| | | | |
|---|---|---|---|
| 2714593 | 10/1978 | Germany | 427/203 |
| 3101778 | 8/1982 | Germany | |
| 2-115451 | 4/1990 | Japan | 428/143 |
| 578408 | 6/1946 | United Kingdom | |
| 1184222 | 3/1970 | United Kingdom | |
| 1256520 | 12/1971 | United Kingdom | |

*Primary Examiner*—Terry J. Owens
*Attorney, Agent, or Firm*—Davis, Bujold & Streck

[57] ABSTRACT

A method for providing a traffic surface such as a path, roadway, passageway, deck, or airfield runway or taxiway with both anti-slip and retro-reflective characteristics. A first coating of paint is applied to the surface, solid particles are distributed onto the first coating such that the particles sink partially into the first coating, and a second coating of paint is applied over the particles and the first coating to lock the particles into the first coating with the particles projecting from the second coating. Before the second coating is set, retro-reflective beads are distributed over the second coating to sink partially into the second coating between the projecting particles. The beads are bonded into the second coating and project from the second coating. The beads are smaller than the particles and the particles project from the second coating by more than the beads to overshadow the beads.

5 Claims, 2 Drawing Sheets

METHOD FOR FORMING TRAFFIC SURFACES HAVING DOUBLE-COATED BONDING OF ANTI-SLIP PARTICLES AND CONTAINING RETRO-REFLECTIVE BEADS

This invention relates to anti-slip surfaces and especially to methods of providing traffic or other surfaces with anti-slip characteristics.

BACKGROUND OF THE INVENTION

Anti-slip surfaces are required especially in industrial, commercial and other environments where the presence of water, oil or other substances on paths, roadways, passageways, decks, airfield runways and taxiways, or other traffic surfaces may create danger through loss of friction, for example, to persons, vehicles or aircraft.

SUMMARY OF THE INVENTION

It is one of the objects of the present invention to provide a method of providing improved anti-slip traffic or other surfaces.

According to one aspect of the present invention a method of providing a surface with anti-slip characteristic, comprises the steps of applying to the surface a first coating of paint, distributing particles of mineral or other material on the coating before the coating has dried, and then applying a second coating of paint over the particles and the first coating to lock the particles into the first coating with the particles projecting from the second coating.

The paint, which may be applied in liquid or other form and contain fillers and/or pigments, may be based on an alkyd resin and may contain chlorinated rubber. Alternatively, an epoxy-resin based paint may be used.

The said particles may be particles of aluminium oxide, silicon oxide, zirconium or plastics material, or may be granules of rubber or cork.

The same paint may be used for the second coating as for the first, and the paint and the particles may be applied by spray. The particles may, alternatively, be applied by a controlled gravity-feed system or by an electrostatic method.

The method of the present invention may be successfully applied economically and readily to paths, roadways, passageways, decks (for example on ships and oil platforms), helicopter landing pads and airfield runways and taxiways. Furthermore, there is generally no danger caused if the painted surface is damaged through wear, or if for some reason there is breakdown in the bond between paint and surface. Wear or other damage can be very easily repaired simply by re-applying the method of the invention to the relevant region.

According to another aspect of the present invention there is provided a surface having a first coating of paint applied to that surface, particles of mineral or other material distributed in the first coating, and a second coating of paint over the particles and the first coating and locking the particles in the first coating with the particles projecting.

Anti-slip surfaces, and methods of providing them, in accordance with the present invention, will now be described, by way of example, with reference to the accompanying drawings, in which:

DESCRIPTION OF THE PREFERRED EMBODIMENTS

Figure 1:
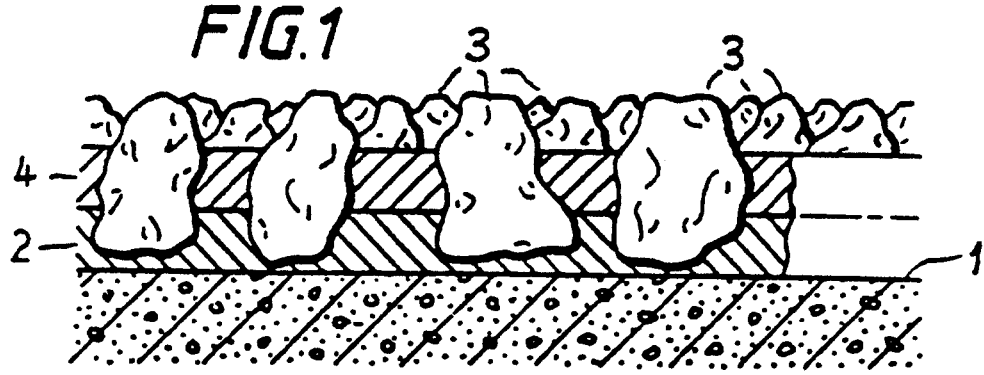
FIG. 1 is a section illustrative of an anti-slip surface laid in accordance with the present invention.

FIG. 1 shows a section through a two-coat anti-slip paint system that has been applied to a blacktop (for example, bituminous or tar macadam) or concrete surface of a path, roadway or airfield runway or taxiway, in accordance with the present invention. As an alternative, the traffic surface may be a metal or other deck for helicopter use on a ship or oil rig. The paint used in the method to be described is based on an alkyd resin of medium chain length, containing chlorinated rubber and pigments. As an alternative, it may have an epoxy resin base.

Referring to FIG. 1, paint is applied to the traffic surface 1 after the surface 1 has been swept clear of loose stones and has been cleaned so as to be free from dirt and grease. A first coat 2 of the paint is applied to the cleaned, and dry, surface 1 by an airless spray to produce a film thickness of about 0.15 mm. While the paint is still wet, mineral particles 3 are distributed evenly over it, for example by spray.

The mineral particles 3 used are particles of white aluminium oxide having a 36-mesh grit size. These sink partially into the wet paint, and if the paint were allowed to dry, without taking further steps, the resultant surface would, owing to these particles, have a distinct anti-slip characteristic. However, the particles 3 would tend to break free from the paint during use of the surface 1. In order to overcome this problem in accordance with the invention, a second coat 4 of the paint is applied to lock the particles 3 in the first coat 2.

The second coat 4 of paint, which is applied after about 20 minutes has passed from application of the first coat 2, is applied by airless spay over the mineral particles 3 and the first coat 2. The thickness of the wet film of the second coat 4, may be the same as, or less than, that of the first coat 2.

Once the paint is hard, the anti-slip surface is finished and may be put into immediate use. The particles 3 are bonded tightly within the two-layer paint coating, and have been found not to break free even under hard operational conditions.

It has been assumed above that the surface 1 is generally non-porous so that little or none of the first coating 2 is absorbed into it. If the surface 1 is porous, it is primed before application of the first coat 2, so as to ensure that the first coat 2 remains as a distinct film for receiving and holding the particles 3. The primer may be applied simply as an initial thin coat of the same paint as is used for building up the coats 2 and 4.

Tests on surfaces provided using generally the same technique as described above with reference to FIG. 1, have revealed superior anti-slip characteristics. In particular, three surfaces prepared in that way have been submitted to testing by a friction-measuring device which measures load and drag on a wheel.

The tests were carried out with the device moving over each of the three surfaces at a speed of about 5 km/hr and with water wetting the wheel at a rate of 4.5 liter/min, under known stresses applied in load and drag. For the particular application under consideration, namely a helicopter landing pad on a deck without netting on the deck, the Civil Aviation Authority's Directorate of Research has specified that the level of friction for an untethered and unchocked aircraft is to be no less than 0.61, and desirably 0.70 or more. The three surfaces, each tested in four successive runs of the friction-measuring device, gave friction levels of: 0.89, 0.85, 0.95 and 1.00; 1.00, 0.93, 1.04 and 1.05; and 0.95, 1.00, 1.00 and 0.98.

The paint used, with included pigmentation, may be that sold as CATAPHOS TYPE CR or CATAPHOS TYPE OPE by Berger Traffic Markings Limited of Midsomer Norton, Bath, England. These paints meet the standard BS 6044 of the British Standards Institution, for road marking.

Although the particles used in the above-described method are of 36-mesh grit size, particles of finer or coarser size may be used; particles as large, say, as 8-mesh grit size, and mixtures of different sizes may be used. As a general matter, it has been found advantageous for the particle grit size and the thicknesses of the two coats of paint to be chosen in relation to one another, such that for the average-dimension of particle within that grit sizing, about one third projects from the second coating. The particles need not be of aluminium oxide, but may be, for example, of silicon carbide (to give sharpness), zirconium (to give toughness), or plastics material (for example, for spark suppression), and may even be granules of rubber or cork (to give resilience and/or compliance).

The surface may be given reflectivity by including glass beads. Such beads may be added by gravity feed or otherwise (for example by spray) either during application of the second coat of paint, or immediately afterwards before that paint has set. The beads, which are thus bonded to the surface by the second coat, are preferably of significantly smaller dimension than the particles of aluminium oxide or other material used. They are preferably no more than two-thirds the size, so that they will nestle between the particles on the surface and be protected from dislodgement; more particularly, glass beads tend to present a slippery surface, especially when wet, but this does not have deleterious effect where they are interspersed between significantly larger friction-particles.

In the case of an anti-slip surface manufactured as described with reference to FIG. 1, it is possible by suitable masking following application of the second coat of paint, to delineate one or more areas to receive glass beads so that these areas are thereby distinguishable by their retro-reflectivity. However, these one or more areas can also be distinguished by colour by using an appropriately coloured paint for the second coat, or for both coats, where the beads are to be incorporated. More particularly, the one or more areas may be blanked off by masking while the process described above with reference to FIG. 1 is carried out. Once this is completed, the blanked-off area or areas are treated separately to build up a surfacing within them. In the latter respect, with the margins of the previously blanked-off areas masked, the first coat of colour paint is applied, followed by the distribution of the mineral particles and application of the second coat of coloured paint, and then this is followed by application of the glass beads. The resultant marking is clearly visible in daylight by virtue of its colour, and at night by virtue of its colour and retro-reflectivity.

Figure 2:
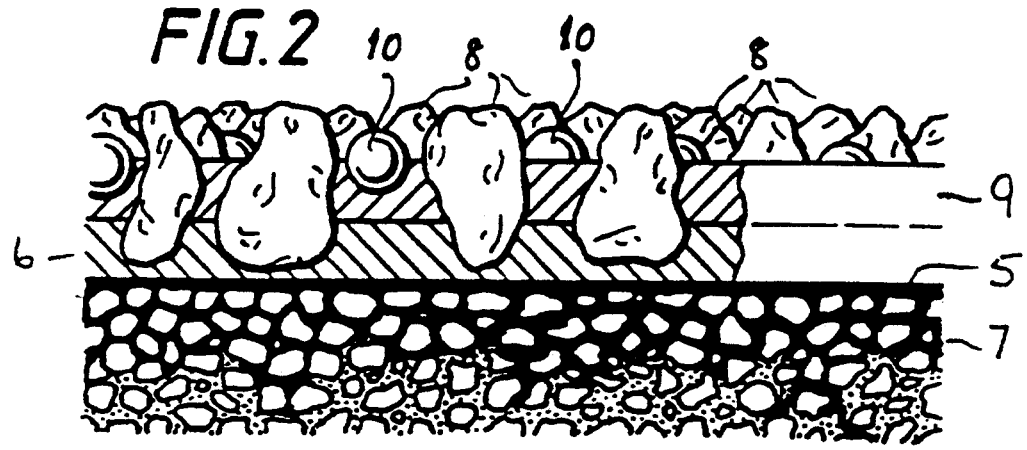
FIG. 2 is a section illustrative of a combined anti-slip and retro-reflective surface laid in accordance with the present invention.

An example of a paint system incorporating retro-reflectivity is illustrated in FIG. 2.

Referring to FIG. 2, a swept and cleaned traffic surface 5 is given a first coat 6 of an epoxy-resin based paint to a thickness of 0.3 mm; in the case illustrated, the surface 5 has been previously primed with the paint to the extent necessary to enable the first coat 6 to be established without absorption into its sub-surface 7. While the paint of the first coat 6 is still wet, mineral particles 8 having a 16-mesh grit size are applied evenly over the paint to sink into it, at a rate of some 1 to 1.5 kg/m$^2$.

A second coat 9 of the paint is applied to a thickness of 0.3 mm, over the first coat 6 to lock in the particles 8. During application of this second coat 9, or immediately after, while the second coat 9 is still wet, glass beads 10 are distributed evenly over it to sink in partially, and to be firmly bonded into the coat 9 when it dries.

The beads 10, which are at least nominally spherical, have diameters generally within the range 0.18 to 0.40 mm, and are applied at a rate of some 400 to 500 g/m$^2$. They are interspersed between the significantly larger particles 8 to nestle down between them in the second coat 9. The beads 10 are accordingly protected by the particles 8 and overshadowed shielded by them so as not to have any effect on the overall anti-slip characteristic of the surface.

By suitable masking, as referred to above, it is possible to confine the glass beads to certain areas only, of the anti-slip surface. A helicopter landing pad constructed in this way is shown in FIG. 3.

Figure 3:
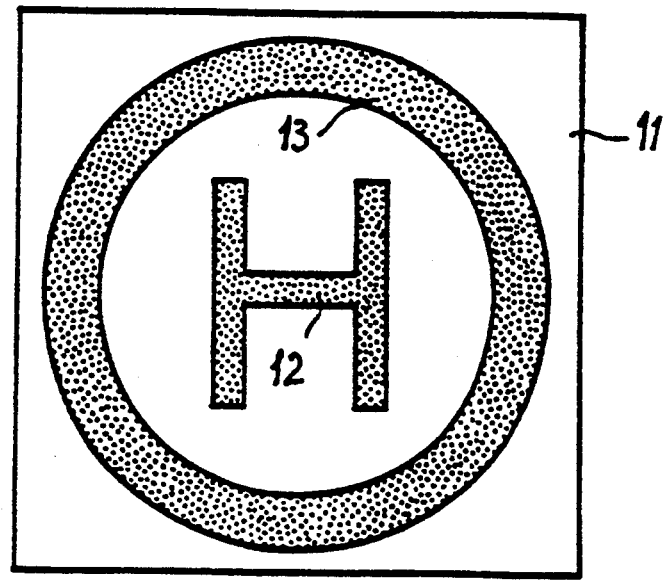
FIG. 3 shows a helicopter landing pad in accordance with the present invention.

Referring to FIG. 3, the helicopter landing pad is a square area 11 marked with the conventional symbol consisting of an area 12 delineating the letter 'H', and an area 13 that delineates an enclosing circle. The whole of the square area 11 has the two-coat anti-slip surfacing system of the present invention, but it is only the areas 12 and 13 that also include glass beads in the manner described with reference to FIG. 2. The resultant retro-reflectivity of the areas 12 and 13 make them distinctive, but they are also distinguished from their surrounds within the area 11 by use of coloured paint for the second coat or for both the first and second coats.

Figure 4:
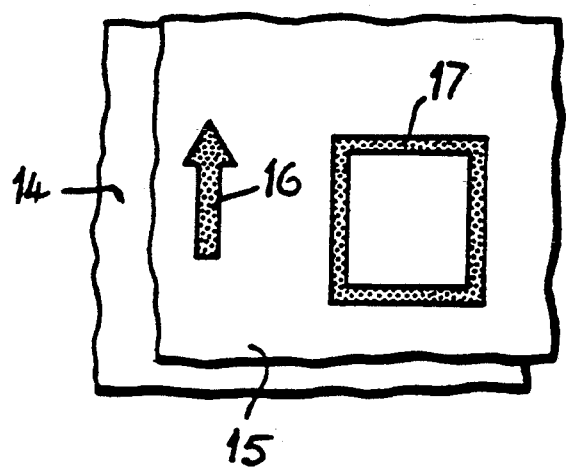
FIG. 4 shows part of an airfield taxiway with inset symbology, laid in accordance with the present invention.

In certain applications, strips or other narrow areas of the anti-slip surface may be masked so as to be left clear of the mineral particles, and then subsequently filled with beads to give that strip or other area retro-reflectivity. This latter technique may be adopted especially where narrow lettering or other marking is to be inset into the anti-slip surfacing, and is to be very clearly visible at night. An example of application of this technique to the marking of an airfield taxiway with an arrow and box symbol will now be described with reference to FIG. 4. FIG. 4 shows part of the taxiway with its anti-slip surfacing broken away to reveal the concrete base surface beneath.

Referring to FIG. 4, the concrete base 14 of the taxiway is surfaced with a two-coat anti-slip system 15 that is inset with strips 16 and 17 of glass beads which delineate an arrow and an open-box symbol respectively. The anti-slip system 15 is applied by the two-coat process described above with reference to FIG. 1 after the concrete base 14 has first been treated with a primer to improve adhesion of the system 15 with it. Immediately the first coat of the paint system has been applied to cover the base 14, the areas to be occupied by the strips 16 and 17 are masked off in order to keep them clear of the mineral particles distributed on the first coat in the process. Once the distribution of the mineral particles has been carried out, the masking is removed and the second coat of the system is then subsequently applied to cover the whole of the first coat, including the areas (for the strips 16 and 17) that are free of mineral particles.

Before the second coat is dry, masking is laid down around the mineral-free areas (strips 16 and 17) to leave them open, and the mineral-occupied regions around them covered over. Glass beads are now distributed throughout the revealed strips 16 and 17 to sink partially into the still-wet second coat and be held firmly there when the system has dried out. The masking confines the beads to the strips 16 and 17 so that on its removal in completion of the anti-slip surfacing operation, the arrow and open-box symbols delineated by the strips 16 and 17 are clearly recognisable through the distinctive retro-reflectivity they exhibit.

The beads within the strips 16 and 17 are of significantly smaller dimension than the mineral particles used for the anti-slip surfacing, so that the beads are protected (by being effectively overshadowed) to a certain degree by the mineral particles surrounding them in the surface. This protection is greater the narrower the strips 16 and 17, and provided the strips 16 and 17 are kept narrow, the anti-slip characteristic of the surface elsewhere can be maintained across the strips 16 and 17 without significant loss. In this respect, the strip-width is desirably significantly less than the smallest 'footprint' likely to occur on the surface.

The widths of the inset strips 16 and 17 of glass beads are significantly less than the widths of the narrowest tires that are likely to be used on that surface. Thus, as a tire of an aircraft passes across, or even along the strip, a significant proportion of the ground-contact area of that tire (its 'footprint') overlaps the strip so as to remain in contact with the mineral-occupied surrounds of that strip and be afforded adequate anti-slip restraint.

The present invention is also applicable to the provision of anti-slip tiles for surfacing an area, such as for example, the helicopter deck of an oil-rig. Such tiles, which may, for example, be rectangular and be, specifically, 1 m square, may be bonded by adhesive, or bolted, to whatever, deck or other structure, is to be surfaced. The construction of a tile for this purpose, is illustrated in FIG. 5.

Figure 5:
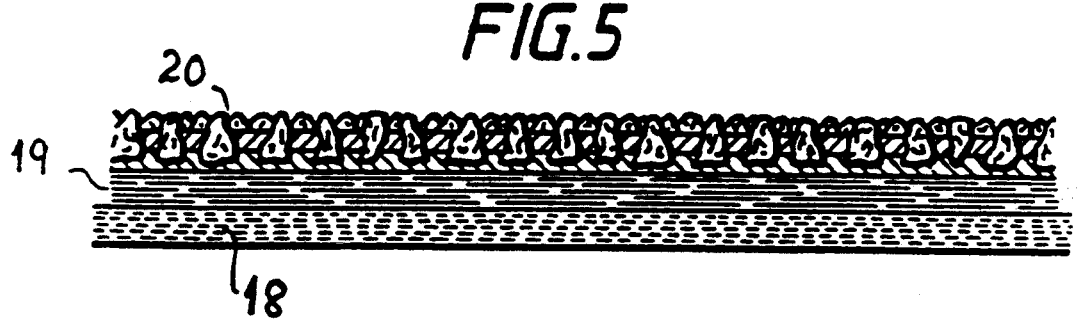
FIG. 5 is a section through an anti-slip surfacing tile according to the present invention.

Referring to FIG. 5, the tile, which has an overall thickness of some 5 mm to 10 mm, has a base comprising two (or more) crossed plies 18 and 19 of glass fibre that are bonded together with, for example, an epoxy resin applied in two coats to soak into and through them. An anti-slip system 20 is applied to the top plie 19 using any of the methods described above.

The base of the tile may, as an alternative, be a steel or other metal plate, or a sheet of plastics material, or even cloth. Also, the tile may have provision for interlocking with other tiles so that together they provide a continuous surface with firm retention between each tile and its neighhours. The interlocking may also incorporate provision for minimizing the gap between one tile and the next.

The deposition of the mineral particles in any of the above-described methods may be made using electrostatic techniques rather than distribution by gravity.

I claim:

1. A method of providing a traffic surface with both anti-slip and retro-reflective characteristics, comprising a first step of applying to the surface a first coating of paint, a second step performed before the first coating has set, of distributing solid particles on the first coating to sink partially into the first coating, a third step, performed subsequent to said second step, of applying a second coating of paint, said second coating of paint being applied over the particles and the first coating to lock the particles into the first coating with the particles projecting from the second coating, and a fourth step performed before the second coating is set, of distributing retro-reflective beads over the second coating to sink partially into the second coating between the projecting particles for bonding the beads into the second coating with the beads projecting from the second coating, the beads being smaller than said particles and the particles projecting from the second coating by more than the beads to overshadow the beads.

2. A method according to claim 1 wherein the beads are confined to portions of the second coating for delineating traffic markings.

3. A method according to claim 1 including a provision of paint-color differences within at least the second coating to delineate markings of the traffic surface.

4. A method of laying down a friction surface on a part of a traffic substrate of an aircraft-movement area, comprising the steps of priming said part of the substrate, applying a first coating of paint to a controlled thickness to the primed-part of the substrate, the priming step rendering said part of the substrate non-porous to the paint, distributing friction particles evenly on the first coating before the first coating has set, the friction particles being of a particle size to sink only partially into the first coating, applying a second coating of paint of controlled thickness to the first coating to lock the particles into the first coating with the particles projecting from the second coating, the thicknesses of the first and second coatings being controlled in relation to the particle size of the particles to leave substantially one third of each particle projecting from the second coating, the method including a further step performed before the second coating is set, of distributing retro-reflective beads over a defined region of the second coating to sink partially into the second coating between the projecting particles for bonding the beads into the second coating with the beads projecting from the second coating within said region, the beads being smaller than said particles and the particles projecting from the second coating by more than the beads to overshadow the beads within said region.

5. A method of laying down a friction surface on a part of a traffic substrate of an aircraft-movement area, comprising the steps of priming said part of the substrate, applying a first coating of paint to a controlled thickness to the primed-part of the substrate, the priming step rendering said part of the substrate non-porous to the paint, distributing friction particles evenly on the first coating before the first coating has set, the friction particles being of a particle size to sink only partially into the first coating, applying a second coating of paint of controlled thickness to the first coating to lock the particles into the first coating with the particles projecting from the second coating, the thicknesses of the first and second coatings being controlled in relation to the particle size of the particles to leave substantially one third of each particle projecting from the second coating, wherein the distribution of the particles on the first coating is limited to only part of the first coating to delineate a region of the superimposed first and second coatings that is free of the distributed particles, and wherein the method includes a step performed before the second coating is set, of distributing retro-reflective beads within said region to sink partially into the second coating for bonding the beads thereto with the beads projecting from the second coating within said region, the beads being smaller than said particles and the particles projecting from the second coating by more than the beads to overshadow the beads within said region.

* * * * *